United States Patent

Yabushita

(10) Patent No.: US 11,874,398 B2
(45) Date of Patent: Jan. 16, 2024

(54) MOVEMENT AMOUNT DETECTION SYSTEM, MOVEMENT AMOUNT DETECTION METHOD AND NON-TRANSITORY COMPUTER READABLE MEDIUM

(71) Applicant: Toyota Jidosha Kabushiki Kaisha, Toyota (JP)

(72) Inventor: Hidenori Yabushita, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 446 days.

(21) Appl. No.: 17/169,693

(22) Filed: Feb. 8, 2021

(65) Prior Publication Data

US 2021/0247491 A1 Aug. 12, 2021

(30) Foreign Application Priority Data

Feb. 12, 2020 (JP) ................................. 2020-021313

(51) Int. Cl.
*G01S 7/48* (2006.01)
*G01S 17/931* (2020.01)

(52) U.S. Cl.
CPC .......... *G01S 7/4808* (2013.01); *G01S 17/931* (2020.01)

(58) Field of Classification Search
None
See application file for complete search history.

(56) References Cited

U.S. PATENT DOCUMENTS

| 2012/0256837 A1* | 10/2012 | Chang | G06F 3/03543 |
| | | | 345/163 |
| 2013/0336537 A1* | 12/2013 | Reeves | G06V 20/588 |
| | | | 382/104 |
| 2016/0144511 A1* | 5/2016 | Romanov | G05D 1/0253 |
| | | | 701/28 |

FOREIGN PATENT DOCUMENTS

| JP | H04151715 A | 5/1992 |
| JP | 2015-187798 A | 10/2015 |

OTHER PUBLICATIONS

Sekimori, D. et al, "Self-Localization for Indoor Mobile Robots Using Multiple Optical Mouse Sensor Values and Simple Global Camera Information", IEEE International Conference on Robotics and Biometrics—ROBIO, Department of Mechanical Engineering, Akashi National College Of Technology, 679-3 Nishioka, Uozumi-cho, Akashi-shi, Hyogo, 674 8501, Japan, p. 3478-3485, 2005.

* cited by examiner

*Primary Examiner* — Hovhannes Baghdasaryan
(74) *Attorney, Agent, or Firm* — Dinsmore & Shohl LLP (57) ABSTRACT

A movement amount detection system capable of accurately detecting a movement amount at a reference point of a moving body is provided. A movement amount detection system calculates a second movement amount at the reference point by using first movement amounts each of which is detected based on image data acquired by a respective one of the plurality of optical sensors, and inversely calculates a third movement amount at each of the plurality of places where a respective one of the plurality of optical sensors is disposed from the second movement amount, and the arithmetic processing unit determines an optical sensor that should be excluded in the calculation of the movement amount at the reference point of the moving body based on a difference between the first movement amount and the (Continued)

third movement amount at each of the plurality of optical sensors.

8 Claims, 6 Drawing Sheets

MOVEMENT AMOUNT DETECTION SYSTEM, MOVEMENT AMOUNT DETECTION METHOD AND NON-TRANSITORY COMPUTER READABLE MEDIUM

CROSS REFERENCE TO RELATED APPLICATIONS

This application is based upon and claims the benefit of priority from Japanese patent application No. 2020-21313, filed on Feb. 12, 2020, the disclosure of which is incorporated herein in its entirety by reference.

BACKGROUND

The present disclosure relates to a movement amount detection system, a movement amount detection method and a non-transitory computer readable medium.

A movement amount detection system that detects (i.e., measures) an amount of movement of a moving body (i.e., a distance moved by a moving body, hereinafter referred to as a movement amount of the moving body) by using a plurality of optical sensors provided in the moving body has been known. Japanese Unexamined Patent Application Publication No. 2015-187798 discloses a configuration in which four optical sensors such as optical-mouse-type sensors are disposed at the front-right, front-left, rear-right, and rear-left corners, respectively, of a moving body. Japanese Unexamined Patent Application Publication No. H4-151715 discloses a movement amount detection system using optical-mouse-type sensors as optical sensors, in which four optical sensors are arranged at intervals of 90° on the same circumference in a plan view.

SUMMARY

In the detection (i.e., measurement) of a movement amount based on image data obtained by an optical sensor, the accuracy of the detection deteriorates as the deviation (i.e., the difference) between the distance from the optical sensor to the floor surface and the depth of field of the optical sensor increases. In the detection (i.e., measurement) of a movement amount of a moving body, a movement amount of the moving body that is detected (i.e., measured) at a reference point located therein (hereinafter also expressed as the movement amount at the reference point of the moving body) is calculated by converting detected values of movement amounts each of which is detected by a respective one of a plurality of optical sensors into movement amounts at the reference point of the moving body and averaging these converted values. However, there is a problem that if a value detected by an optical sensor of which a deviation (i.e., a difference) between the distance from the optical sensor to the floor surface and the depth of field of the optical sensor is large is included in those used in the calculation of the movement amount at the reference point of the moving body, the accuracy of the detection (i.e., the measurement) of the movement amount at the reference point of the moving body deteriorates.

The present disclosure has been made in view of the above-described circumstances and an object thereof is to provide a movement amount detection system capable of accurately detecting a movement amount at a reference point of a moving body.

A first exemplary aspect is a movement amount detection system configured to detect a movement amount of a moving body, including: a plurality of optical sensors disposed in the moving body, each of the plurality of optical sensors being configured to acquire image data of a floor surface, the number of the plurality of optical sensors being at least three; a movement amount acquisition unit configured to acquire, by using the image data acquired by the optical sensors, the movement amount of the moving body at each of a plurality of places where a respective one of the plurality of optical sensors is disposed; and an arithmetic processing unit configured to calculate the movement amount of the moving body at a reference point located thereon by using the movement amount of the moving body at each of the plurality of places where a respective one of the plurality of optical sensors is disposed, acquired by the movement amount acquisition unit, in which the arithmetic processing unit calculates a second movement amount at the reference point by using first movement amounts each of which is detected based on image data acquired by a respective one of the plurality of optical sensors, and inversely calculates a third movement amount at each of the plurality of places where a respective one of the plurality of optical sensors is disposed from the second movement amount, and the arithmetic processing unit determines, among the plurality of optical sensors, an optical sensor that should be excluded in the calculation of the movement amount at the reference point of the moving body based on a difference between the first movement amount and the third movement amount at each of the plurality of optical sensors.

A value detected by an optical sensor of which a deviation (i.e., a difference) between a distance from the optical sensor to the floor surface and the depth of field of the optical sensor is large is not included in those used in the calculation of the movement amount at the reference point of the moving body, so that the movement amount at the reference point of the moving body can be accurately detected (i.e., accurately measured).

Further, when the moving body includes a plurality of wheels, the plurality of optical sensors are arranged so that a line connecting any two of them is not parallel to a line connecting the centers of any two of the plurality of wheels in the moving body. In this manner, it is possible, when the moving body gets over an obstacle such as a step with a plurality of wheels, to reduce a possibility that two optical sensors are simultaneously excluded in the calculation of the movement amount at the reference point of the moving body.

Further, the moving body further includes a plurality of height detection sensors, each of the plurality of height detection sensors being disposed near a respective one of the plurality of optical sensors and configured to detect a height of the respective one of the plurality of optical sensors from the floor surface, in which values detected by the height detection sensors are taken into consideration when the optical sensor that should be excluded in the calculation of the movement amount at the reference point of the moving body is determined. In this manner, it is possible to detect the movement amount at the reference point of the moving body more accurately.

Further, each of the height detection sensors is one that uses a pattern projection principle. It is possible to detect the movement amount at the reference point of the moving body more accurately.

Further, the plurality of optical sensors are arranged so that they are not located on the same circumference in the moving body. It is possible, by making the arrangement of the plurality of optical sensors more random, to reduce a possibility that two or more optical sensors are simultaneously excluded the calculation of the movement amount at the reference point of the moving body.

Another exemplary aspect is a method for detecting a movement amount including: a first step of acquiring, by using image data of a floor surface acquired by a plurality of optical sensors disposed in a moving body, a movement amount of the moving body at each of a plurality of places where a respective one of the plurality of optical sensors is disposed, each of the plurality of optical sensors being configured to acquire the image data of the floor surface, the number of the plurality of optical sensors being at least three; and a second step of calculating the movement amount of the moving body at a reference point located thereon by using the movement amount of the moving body at each of the plurality of places where a respective one of the plurality of optical sensors is disposed, acquired in the first step, in which in the first step, a second movement amount at the reference point is calculated by using first movement amounts each of which is detected based on image data acquired by a respective one of the plurality of optical sensors, and a third movement amount is inversely calculated at each of the plurality of places where a respective one of the plurality of optical sensors is disposed from the second movement amount, and among the plurality of optical sensors, an optical sensor that should be excluded the calculation of the movement amount at the reference point of the moving body is determined based on a difference between the first movement amount and the third movement amount at each of the plurality of optical sensors.

A value detected by an optical sensor of which a deviation (i.e., a difference) between a distance from the optical sensor to the floor surface and the depth of field of the optical sensor is large is not included in those used in the calculation of the movement amount at the reference point of the moving body, so that the movement amount at the reference point of the moving body can be accurately detected (i.e., accurately measured).

Another exemplary aspect is a non-transitory computer readable medium storing a program for causing a computer to perform:

a first step of acquiring, by using image data of a floor surface acquired by a plurality of optical sensors disposed in a moving body, a movement amount of the moving body at each of a plurality of places where a respective one of the plurality of optical sensors is disposed, each of the plurality of optical sensors being configured to acquire the image data of the floor surface, the number of the plurality of optical sensors being at least three; and a second step of calculating the movement amount of the moving body at a reference point located thereon by using the movement amount of the moving body at each of the plurality of places where a respective one of the plurality of optical sensors is disposed, acquired in the first step, in which in the first step, a second movement amount at the reference point is calculated by using first movement amounts each of which is detected based on image data acquired by a respective one of the plurality of optical sensors, and a third movement amount is inversely calculated at each of the plurality of places where a respective one of the plurality of optical sensors is disposed from the second movement amount, and among the plurality of optical sensors, an optical sensor that should be excluded the calculation of the movement amount at the reference point of the moving body is determined based on a difference between the first movement amount and the third movement amount at each of the plurality of optical sensors.

According to the present disclosure, it is possible to accurately detect (i.e., accurately measure) a movement amount at a reference point of a moving body.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

The present disclosure will be explained hereinafter through embodiments according to the present disclosure. However, they are not intended to limit the scope of the present disclosure according to the claims. Further, all of the components/structures described in the embodiments are not necessarily indispensable as means for solving the problem. For clarifying the explanation, the following description and the drawings are partially omitted and simplified as appropriate. The same symbols are assigned to the same elements throughout the drawings and duplicated explanations are omitted as appropriate.

First Embodiment

Figure 1:
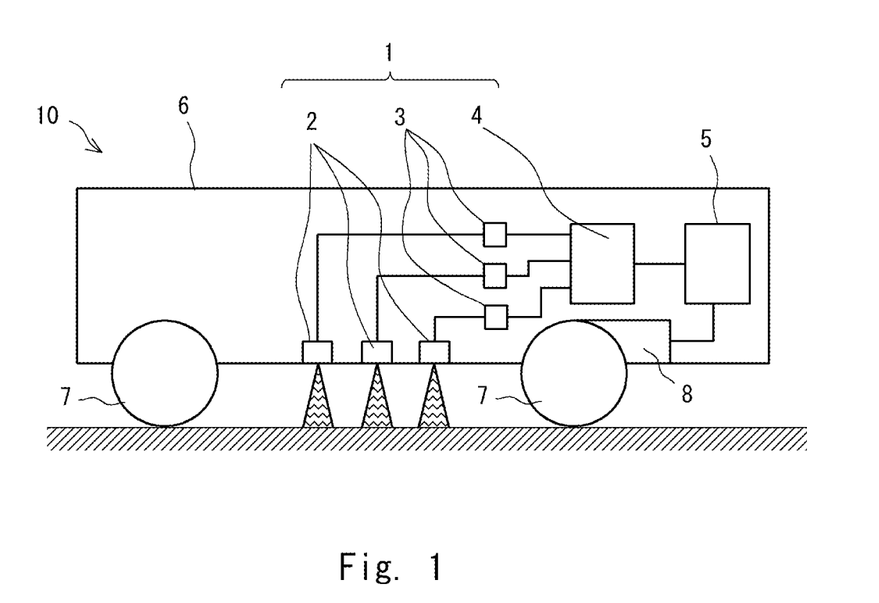
FIG. 1 is a schematic diagram showing a configuration of a movement amount detection system according to a first embodiment in which the movement amount detection system is incorporated into a moving body.

Firstly, a configuration of a movement amount detection system 1 according to a first embodiment will be described with reference to FIG. 1. Note that the movement amount detection system 1 detects a movement amount of a moving body 10 (i.e., a distance moved by the moving body 10). FIG. 1 is a schematic diagram showing a configuration of the movement amount detection system 1 according to the first embodiment in which the movement amount detection system 1 is incorporated into the moving body 10. As shown in FIG. 1, the movement amount detection system 1 includes at least three optical sensors 2, a movement amount acquisition unit(s) 3, and an arithmetic processing unit 4. The optical sensors 2, the movement amount acquisition unit 3, and the arithmetic processing unit 4 are disposed inside a housing 6 of the moving body 10.

The optical sensors 2 acquire image data of a floor surface on which the moving body 10 is located by emitting light to the floor surface by using a light source. Each of the optical sensors 2 is, for example, an optical-mouse sensor. The light source for the optical sensors 2 is, for example, laser light or an LED(s) (Light Emitting Diode(s)). Details of the arrangement of the plurality of optical sensors 2 in the moving body 10 will be described later.

The movement amount acquisition unit 3 acquires a movement amount of the moving body 10 measured at each of a plurality of places where a respective one of the optical sensors 2 is disposed by using image data acquired from the respective one of the optical sensors 2. The movement amount acquisition unit 3 includes an amplifier that amplifies signals sent from the optical sensors 2.

The arithmetic processing unit 4 calculates a movement amount of the moving body at a reference point located thereon by using a movement amount of the moving body 10 at each of the plurality of places where a respective one of the plurality of optical sensors 2 is disposed, acquired by the movement amount acquisition unit 3.

The moving body 10 includes wheels 7, and a drive unit 8 including a motor(s) connected to the wheels 7 and a battery for driving the motor(s) is provided inside the housing 6. By driving the motor(s) in the drive unit 8, the wheels 7 rotate and the moving body 10 moves. The moving body 10 may further include a control unit 5 that controls the drive unit 8 so as to reduce a deviation (i.e., a difference) between the current position of the moving body calculated by the arithmetic processing unit 4 by using the movement amount at the reference position of the moving body and a point closest to the current position on a planned moving path of the moving body 10 that has been planned in advance. As a result, the moving body 10 can autonomously move along the planned moving path.

Each of the arithmetic processing unit 4 and the control unit 5 is an arithmetic processing apparatus including a CPU (Central processing unit), a ROM (Read Only Memory), a RAM (random access memory), an interface for communication, and so on. Further, each of the arithmetic processing unit 4 and the control unit 5 may include a detachable HDD (Hard Disk Drive), an optical disk, a magneto-optical disk or the like that stores various types of programs and control parameters and supplies the program and data to a memory or the like as required. Note that the arithmetic processing unit 4 and the control unit 5 may be configured (e.g., constructed) as one arithmetic unit.

Figure 2:
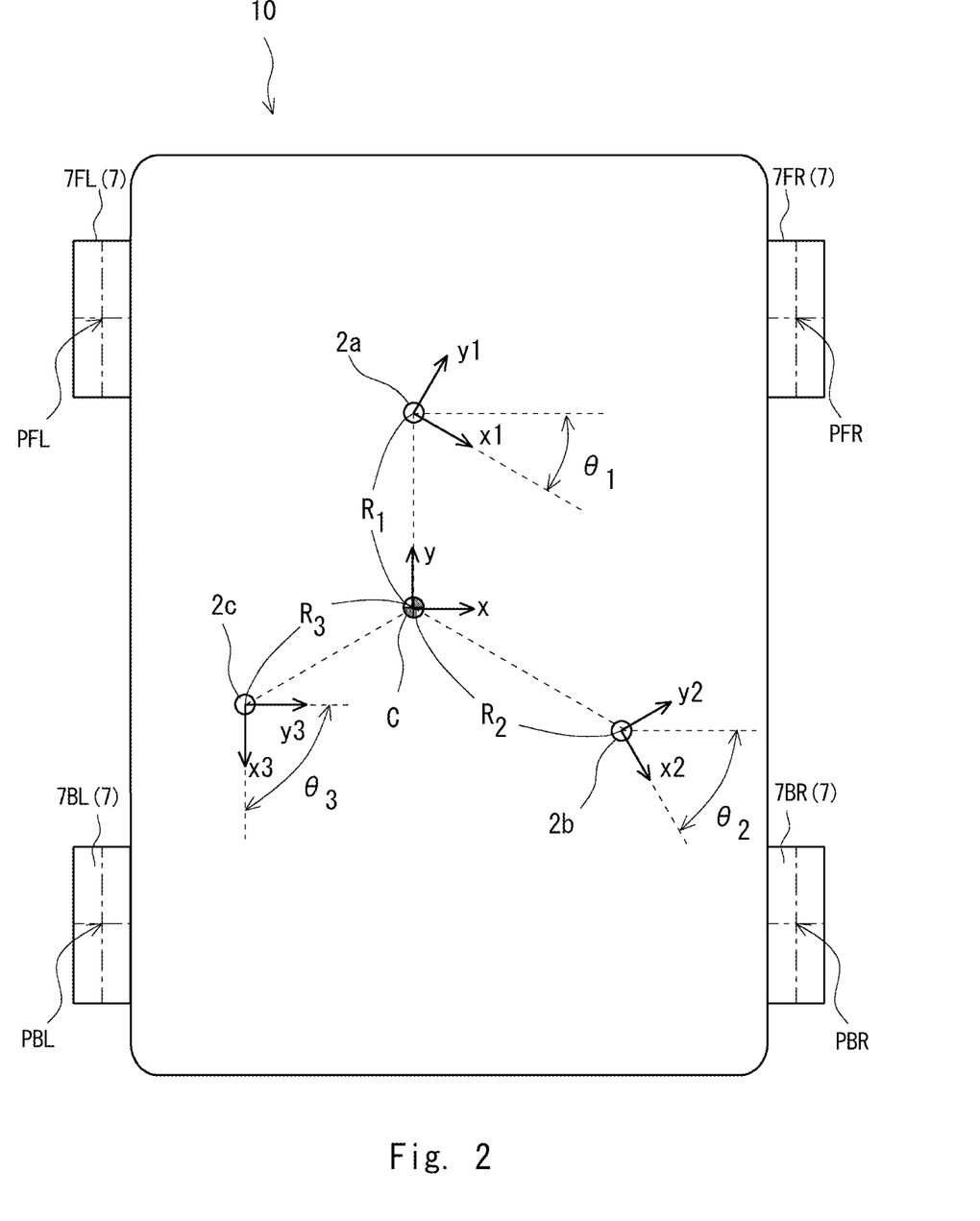
FIG. 2 is a schematic diagram showing an example of an arrangement of a plurality of optical sensors in the moving body into which the movement amount detection system according to the first embodiment is incorporated.

Next, an arrangement of the plurality of optical sensors 2 in the moving body 10 will be described.

FIG. 2 is a schematic diagram showing an example of an arrangement of a plurality of optical sensors 2 (optical sensors 2a, 2b and 2c) in the moving body 10. Note that it is assumed that the moving body 10 includes a plurality of wheels 7 (7FR, 7FL, 7BR and 7BL). Further, the centers of the plurality of wheels 7FR, 7FL, 7BR and 7BL are represented by PFR, PFL, PBR and PBL, respectively.

As shown in FIG. 2, the plurality of optical sensors 2a, 2b and 2c may be arranged so that a line connecting any two of them is not parallel to a line connecting the centers of any two of the plurality of wheels 7FR, 7FL, 7BR and 7BL in the moving body 10. That is, the plurality of optical sensors 2a, 2b and 2c may be arranged so that a line connecting any two of them is not parallel to any of a line connecting the centers PFR and PFL, a line connecting the centers PFR and PBR, a line connecting the centers PFR and PBL, a line connecting the centers PFL and PBR, a line connecting the centers PFL and PBL, and a line connecting the centers PBR and PBL in the moving body 10. Advantages of this arrangement will be described later.

Next, a method for calculating a movement amount at the reference point of the moving body, performed by the arithmetic processing unit 4 will be described. Note that in the following description, FIG. 1 is referred to as appropriate for the configuration of the moving body 10, and FIG. 2 is referred to as appropriate for the arrangement of the plurality of optical sensors 2.

Figure 3:
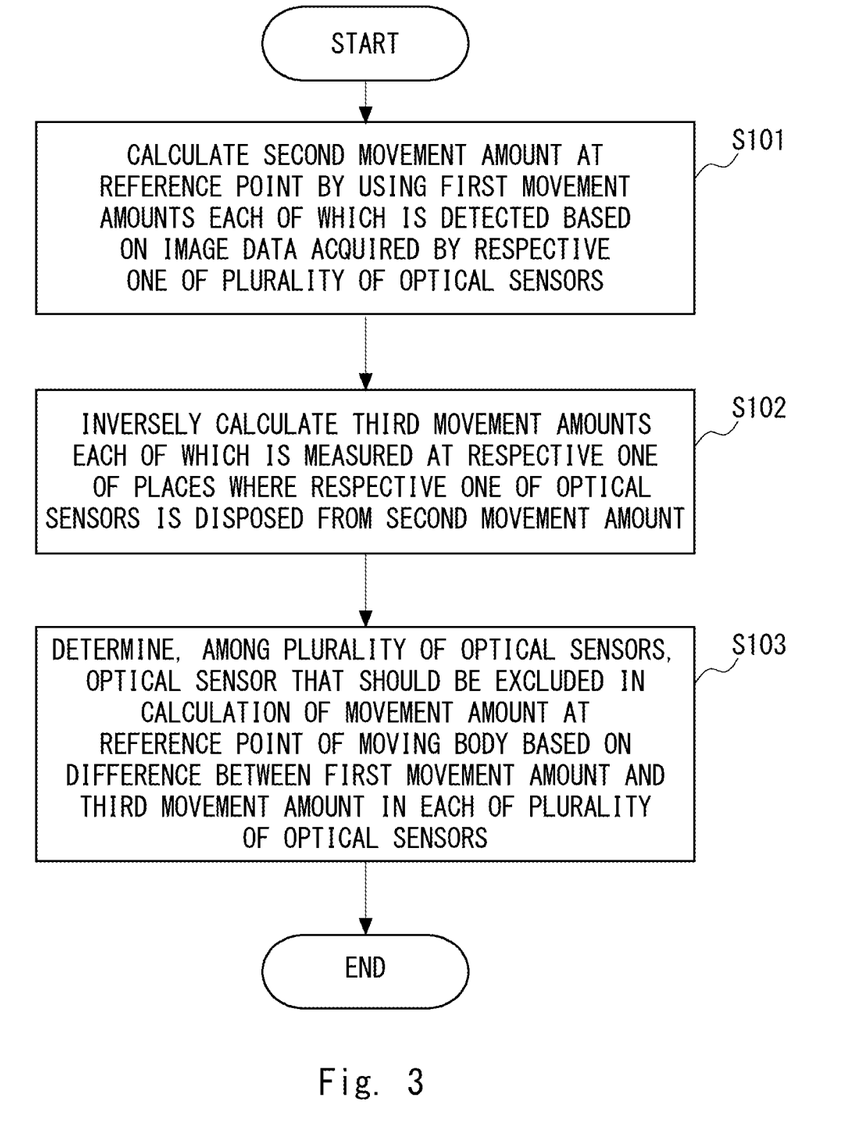
FIG. 3 is a flowchart showing a flow of processes for determining an optical sensor that should be excluded in the calculation of the movement amount at a reference point on the moving body performed in an arithmetic processing unit of the movement amount detection system according to the first embodiment.

FIG. 3 is a flowchart showing a flow of processes for determining an optical sensor that should be excluded in the calculation of the movement amount at the reference point of the moving body, performed by the arithmetic processing unit 4. As shown in FIG. 3, firstly, a second movement amount at the reference point is calculated by using first movement amounts each of which is detected (i.e., measured) based on image data acquired by a respective one of the plurality of optical sensors (step S101). Next, third movement amounts at each of the plurality of places where a respective one of the plurality of optical sensors is disposed are inversely calculated from the second movement amount (step S102). Next, among the plurality of optical sensors, an optical sensor that should be excluded in the calculation of the movement amount at the reference point of the moving body is determined based on a difference between the first movement amount and the third movement amount at each of the plurality of optical sensors (step S103).

Details of the process in each of the steps in FIG. 3 will be described hereinafter by using an example case in which the optical sensors are arranged as shown in FIG. 2.

It is assumed that, as shown in FIG. 2, each of the plurality of optical sensors 2a, 2b and 2c in the moving body 10 is a biaxial sensor that detects movement amounts of the moving body 10 along two coordinate-axis directions. A coordinate system whose center coincides with the control center C, which is the reference point, is defined as an x-y coordinate system, and a predetermined coordinate system set in the optical sensor 2a is defined as an x1-y1 coordinate system. Further, a predetermined coordinate system set in the optical sensor 2b is defined as an x2-y2 coordinate system, and a predetermined coordinate system set in the optical sensor 2c is defined as an x3-y3 coordinate system. It is assumed that the x1-y1 coordinate system of the optical sensor 2a is inclined with respect to the x-y coordinate system, whose center coincides with the control center C, by an angle θ1. It is assumed that the x2-y2 coordinate system of the optical sensor 2b is inclined with respect to the x-y coordinate system, whose center coincides with the control center C, by an angle θ2. Further, it is assumed that the x3-y3 coordinate system of the optical sensor 2c is inclined with respect to the x-y coordinate system, whose center coincides with the control center C, by an angle θ3.

It is assumed that the coordinate center of the optical sensor 2a in the x1-y1 coordinate system is located a distance R1 away from the control center C. It is assumed that the coordinate center of the optical sensor 2b in the x2-y2 coordinate system is located a distance R2 away from the control center C. Further, it is assumed that the coordinate center of the optical sensor 2c in the x3-y3 coordinate system is located a distance R3 away from the control center C. Note that the further the coordinate center of an optical sensor 2 in the predetermined coordinate system is away from the control center C, the more the sensitivity of that optical sensor 2 increases.

Movement amounts (first movement amounts) detected based on image data acquired by the plurality of optical sensors 2a, 2b and 2c are represented by $(\Delta x_1, \Delta y_1)$, $(\Delta x_2, \Delta y_2)$ and $(\Delta x_3, \Delta y_3)$, respectively. Note that $\Delta x_1$ and $\Delta y_1$ are movement amounts of the optical sensor 2a along the x1- and y1-axes, respectively, and $\Delta x_2$ and $\Delta y_2$ are movement amounts of the optical sensor 2b along the x2- and y2-axes, respectively. Further, $\Delta x_3$ and $\Delta y_3$ are movement amounts of the optical sensor 2c along the x3- and y3-axes, respectively. A vector $^t(\Delta x_1, \Delta y_1, \Delta x_2, \Delta y_2, \Delta x_3, \Delta y_3)$ that is obtained by arranging the above-described first movement amounts in a row is defined as a first movement amount group $\Delta P_{sen}$.

Further, a movement amount (a second movement amount) of the control center C is represented by $\Delta P_{odom}$ ($\Delta x_{odom}$, $\Delta y_{odom}$, $\Delta \theta_{odom}$). Note that $\Delta x_{odom}$, $\Delta y_{odom}$ and $\Delta \theta_{odom}$ are movement amounts of the control center C along the x-, y- and θ-axes, respectively.

The first movement amount group $\Delta P_{sen}$ is expressed by the below-shown Expression (1) by using a matrix M that is determined from the second movement amount $\Delta P_{odom}$ and the geometrical arrangement of the optical sensors 2.

$$\Delta P_{sen} = M \Delta P_{odom} \quad (1)$$

The Expression (1) is expressed as the below-shown Expression (2). In the Expression (2), the matrix in the first term on the right side is the matrix M.

[Expression 1]

$$\begin{bmatrix} \Delta x_1 \\ \Delta y_1 \\ \Delta x_2 \\ \Delta y_2 \\ \Delta x_3 \\ \Delta y_3 \end{bmatrix} = \begin{bmatrix} \cos\theta_1 & \sin\theta_1 & R_1 \\ -\sin\theta_1 & \cos\theta_1 & 0 \\ \cos\theta_2 & \sin\theta_2 & R_2 \\ -\sin\theta_2 & \cos\theta_2 & 0 \\ \cos\theta_3 & \sin\theta_3 & R_3 \\ -\sin\theta_3 & \cos\theta_3 & 0 \end{bmatrix} \begin{bmatrix} \Delta x_{odom} \\ \Delta y_{odom} \\ \Delta \theta_{odom} \end{bmatrix} \quad (2)$$

It is possible to calculate the second movement amount $\Delta P_{odom}$ by multiplying the first movement amount group $\Delta P_{sen}$ by a pseudo-inverse matrix $M_{inv}$ of the matrix M expressed by the below-shown Expression (3) from the right side thereof. That is, the second movement amount $\Delta P_{odom}$ is expressed by the below-shown Expression (4). Therefore, in a step S1 in FIG. 3, the second movement amount $\Delta P_{odom}$ is calculated from the first movement amount group $\Delta P_{sen}$ by using the Expression (4).

[Expression 2]

$$M_{inv} = (M^T M)^{-1} M^T \quad (3)$$

$$\Delta P_{odom} = M_{inv} \Delta P_{sen} \quad (4)$$

In a step S2 in FIG. 3, a third movement amount at each of the plurality of places where a respective one of the plurality of optical sensors is disposed is inversely calculated from the movement amount of the control center C, which is the reference point (i.e., from the second movement amount $\Delta P_{odom}$). That is, it is possible to calculate a third movement amount $(\Delta xinv_k, \Delta yinv_k)$ (k=1, 2, 3) at each of the plurality of places where a respective one of the plurality of optical sensors 2a, 2b and 2c is disposed by the below-shown Expression (5).

[Expression 3]

$$\begin{bmatrix} \Delta xinv_k \\ \Delta yinv_k \end{bmatrix} = \begin{bmatrix} \cos\theta_k & \sin\theta_k & R_k \\ -\sin\theta_k & \cos\theta_k & 0 \end{bmatrix} \begin{bmatrix} \Delta x_{odom} \\ \Delta y_{odom} \\ \Delta \theta_{odom} \end{bmatrix} (k=1,2,3) \quad (5)$$

In a step S3 in FIG. 3, a difference value $D_k$ between the first movement amount and the third movement amount is calculated at each of the plurality of optical sensors. That is, the value $D_k$ is calculated by the below-shown Expression (6).

[Expression 4]

$$D_k = (\Delta x - \Delta xinv_k)^2 + (\Delta y - \Delta yinv_k)^2 (k=1,2,3) \quad (6)$$

When the difference value $D_k$ between the first movement amount and the third movement amount exceeds a predetermined threshold in any of the plurality of optical sensors 2a, 2b and 2c, the movement amount acquired by that optical sensor is excluded in the calculation of the movement amount at the reference point of the moving body. This is because it can be inferred that when the value $D_k$ exceeds the predetermined threshold in any of the optical sensors, the movement amount acquired by that optical sensor has been acquired in a state where a deviation (i.e., a difference) between the distance from the optical sensor to the floor surface and the depth of field of the optical sensor is large. Note that the predetermined threshold is determined according to the used optical sensor.

In the arithmetic processing unit 4, the movement amount $\Delta P_{odom}$ (the second movement amount) of the control center C, which is the reference point, is calculated again by performing the calculation expressed by the Expression (4) while excluding the optical sensor of which the difference value $D_k$ between the first movement amount and the third movement amount exceeds the predetermined threshold from those used in the calculation. As described above, it is possible to accurately calculate the movement amount at the reference point of the moving body 10 by excluding the value detected by the optical sensor 2 of which the deviation (i.e., the difference) between the distance from that optical sensor 2 to the floor surface and the depth of field of that optical sensor 2 is large in the calculation of the movement amount at the reference point of the moving body 10.

Note that the arithmetic processing unit 4 may take information obtained by various types of sensors provided in the moving body 10 into consideration when it determines the optical sensor 2 that should be excluded in the calculation of the movement amount at the reference point of the moving body 10. Note that the various types of sensors include, for example, an acceleration sensor and an angular-velocity sensor that detect (i.e., obtain) information related to the movement amount of the moving body 10 (e.g., a velocity, an acceleration, an angular velocity of rotation of the moving body 10), and an inclination sensor that detects (i.e., obtains) information related to the inclination of the moving body 10. It is possible to detect the movement amount at the reference point of the moving body 10 more accurately by comparing the above-described detection of the movement amount at the reference point with the information related to the movement amount of the moving body 10. Further, it is possible to provide a rough estimate as to which of the plurality of optical sensors 2 has a large deviation from the depth of field by acquiring information about the inclination of the moving body 10, thus making it possible to detect the movement amount at the reference point of the moving body 10 more accurately.

Next, advantages that are obtained by arranging the plurality of optical sensors 2a, 2b and 2c so that a line connecting any two of them is not parallel to a line connecting the centers of any two of the plurality of wheels 7FR, 7FL, 7BR and 7BL in the moving body 10 shown in FIG. 2 will be described.

Figure 4:
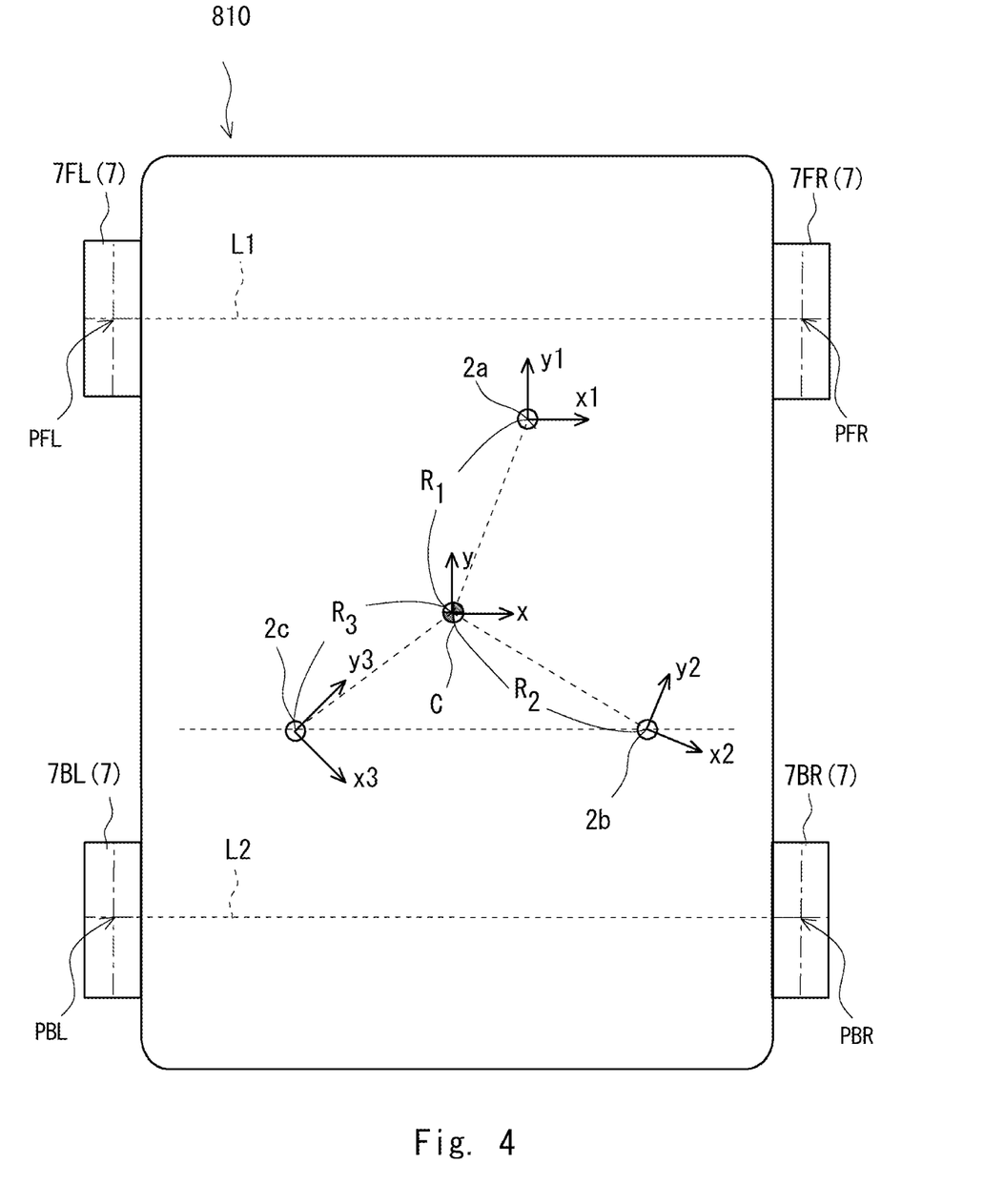
FIG. 4 is a schematic diagram showing an arrangement of a plurality of optical sensors in a moving body according to a comparative example 1.

FIG. 4 is a schematic diagram showing an arrangement of a plurality of optical sensors 2 in a moving body 810 according to a comparative example 1. As shown in FIG. 4, in the moving body 810, the optical sensors 2b and 2c are arranged so that a line connecting them is parallel to a line L1 connecting the centers PFR and PFL and to a line L2 connecting the centers PBR and PBL. In the case where the optical sensors are arranged as described above, there is a possibility that when the moving body 810 gets over (i.e., runs onto) an obstacle such as a step with the wheels 7FL and 7FR, or with the wheels 7BL and 7BR, it may be determined that the deviation from the depth of field is large in both the optical sensors 2b and 2c and hence both of them may be excluded in the calculation.

Figure 5:
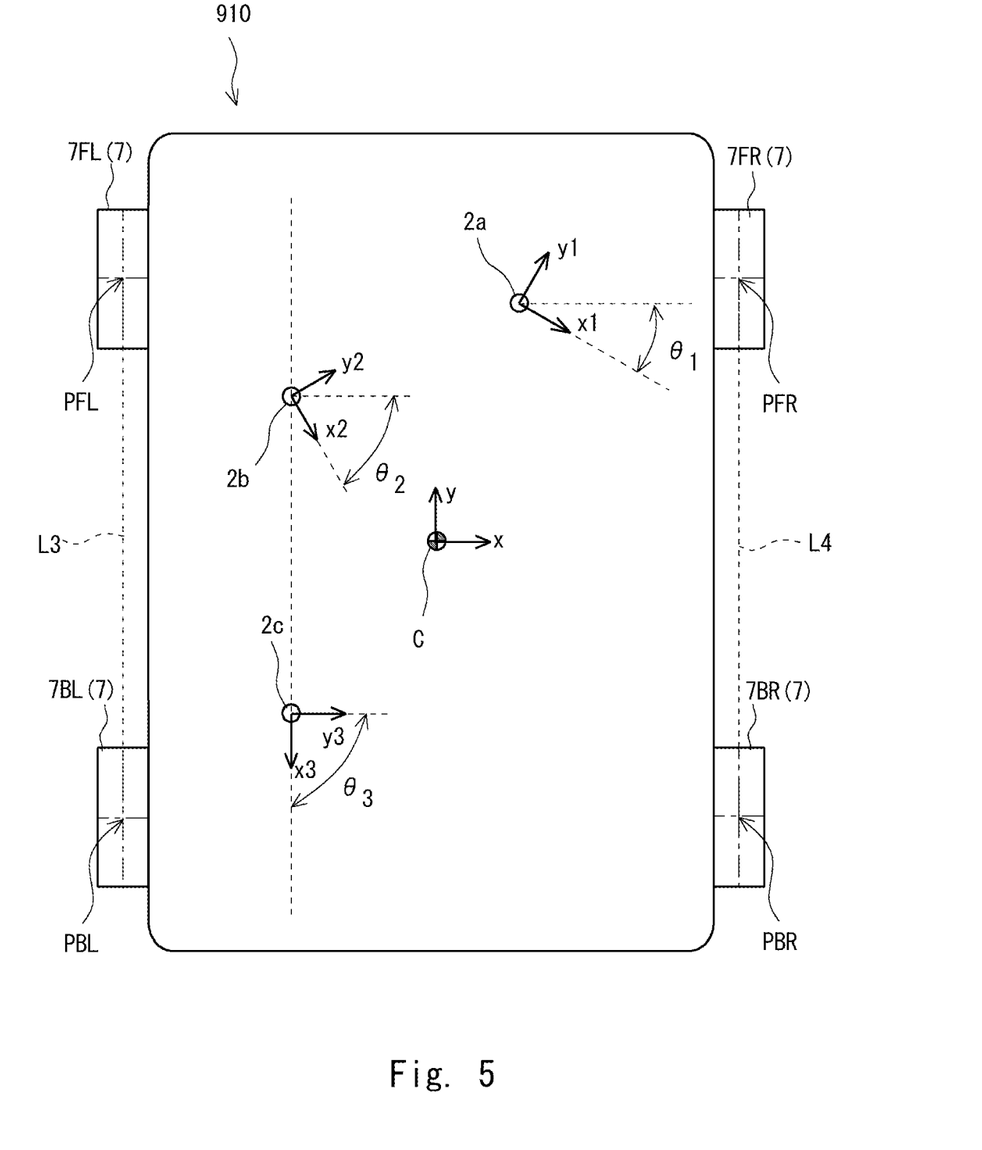
FIG. 5 is a schematic diagram showing an arrangement of a plurality of optical sensors in a moving body according to a comparative example 2.

FIG. 5 is a schematic diagram showing an arrangement of a plurality of optical sensors 2 in a moving body 910 according to a comparative example 2. As shown in FIG. 5, in the moving body 910, the optical sensors 2b and 2c are arranged so that a line connecting them is parallel to a line L3 connecting the centers PFL and PBL and to a line L4 connecting the centers PFR and PBR. In the case where the optical sensors are arranged as described above, there is a possibility that when the moving body 910 gets over an obstacle such as a step with the wheels 7FR and 7BR, or with the wheels 7FL and 7BL, it may be determined that the deviation from the depth of field is large in both the optical sensors 2b and 2c and hence both of them may be excluded in the calculation.

In the case where the number of optical sensors is three as in the case of the moving body 810 shown in FIG. 4 or the moving body 910 shown in FIG. 5, if two optical sensors are simultaneously excluded in the calculation of the movement amount at the reference point of the moving body, it becomes impossible to calculate the movement amount at the reference point of the moving body.

In the moving body 10 shown in FIG. 2, the optical sensors 2a, 2b and 2c are arranged so that a line connecting any two of them is not parallel to a line connecting the centers of any two of the wheels 7FR, 7FL, 7BR and 7BL. Therefore, it is possible, when the moving body 10 gets over an obstacle such as a step with two or more wheels, to reduce a possibility that two optical sensors are simultaneously excluded in the calculation of the movement amount at the reference point of the moving body.

Note that the plurality of optical sensors 2 may be arranged so that they are not located on the same circumference centered at the reference point in the moving body 10. It is possible, by making the arrangement of the plurality of optical sensors 2 more random in the moving body 10, to reduce a possibility that two or more optical sensors 2 are simultaneously excluded in the calculation of the movement amount at the reference point of the moving body.

Second Embodiment

Figure 6:
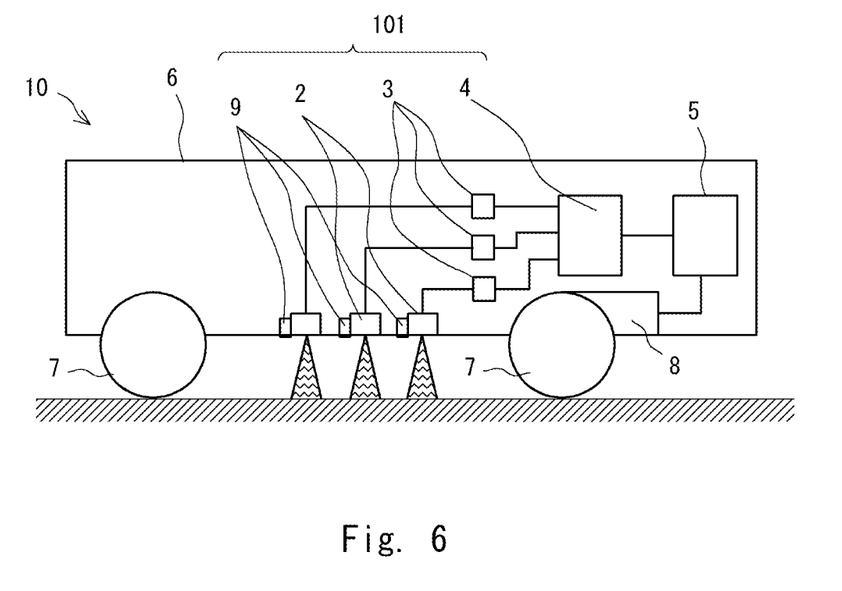
FIG. 6 is a schematic diagram showing a configuration of a movement amount detection system according to a second embodiment in which the movement amount detection system is incorporated into a moving body.

A configuration of a movement amount detection system 101 according to a second embodiment will be described with reference to FIG. 6. FIG. 6 is a schematic diagram showing a configuration of the movement amount detection system 101 according to the second embodiment in which the movement amount detection system 101 is incorporated into a moving body 10. The difference between the movement amount detection system 101 shown in FIG. 6 and the movement amount detection system 1 according to the first embodiment shown in FIG. 1 is that the movement amount detection system 101 includes height detection sensors 9. That is, in the movement amount detection system 101, each of the height detection sensors 9 is disposed near a respective one of the plurality of optical sensors 2 and configured to detect a height of the respective one of the plurality of optical sensors from the floor surface. The rest of the configuration of the movement amount detection system 101 is identical to that of the movement amount detection system 1.

The height detection sensors 9 is, for example, an infrared range sensor. The infrared range sensor is an ordinary sensor including a light emitting unit that emits infrared light and a light receiving unit that receives infrared light reflected by an object. As the infrared light reflected by the object is received by the light receiving unit, the light receiving unit outputs a voltage corresponding to the distance to the object. Therefore, it is possible to detect (i.e., measure) the distance to the object, on which the infrared light has been reflected, by converting the output voltage into the distance.

Note that the height detection sensors 9 is not limited to the infrared range sensor, and may be any sensor capable of measuring the distance to the floor surface in a non-contact manner. The height detection sensors 9 may be, for example, one that uses a pattern projection principle.

The processes performed by the arithmetic processing unit 4 of the movement amount detection system 101 according to the second embodiment are basically the same as those performed by the arithmetic processing unit 4 of the movement amount detection system 1 according to the first embodiment. In the processes performed by the arithmetic processing unit 4 of the movement amount detection system 101 according to the second embodiment, when the optical sensor 2 that should be excluded in the calculation of the movement amount of the moving body 10 at the control center C, which is the reference point, is determined, values detected by the height detection sensors 9 are taken into consideration in the determination. Specifically, in the arithmetic processing unit 4, when the deviation (i.e., the difference) between the distance to the floor surface detected by the height detection sensor 9 and the depth of field of the optical sensor 2 located near that height detection sensor 9 is larger than a predetermined value, this optical sensor 2 is set (i.e., determined) as a candidate for the optical sensor that should be excluded in the calculation of the movement amount at the control center C of the moving body 10. Then, in the arithmetic processing unit 4, the optical sensor that should be excluded is comprehensively determined based on the above-described information and the result of the determination in the processes described above with reference to the flowchart shown in FIG. 3. In this manner, it is possible to detect the movement amount at the reference point of the moving body 10 more accurately.

Note that the present disclosure is not limited to the above-described embodiments, and they may be modified as appropriate without departing from the spirit and scope of the disclosure. For example, in the above-described embodiments, the moving body to which the movement amount detection system is applied has been described by using an example case in which the moving body includes a plurality of wheels. However, the moving body may include only one wheel. Note that it is assumed that the moving body with one wheel is configured so as to maintain its balance by, for example, jetting a gas such as air onto the floor surface. In the above-described embodiments, an example of the configuration in which the movement amount acquisition unit and the arithmetic processing unit are disposed in the moving body is shown. However, the movement amount acquisition unit and the arithmetic processing unit may be configured (i.e., constructed) as separate entities (or separate components) from the moving body. That is, image data acquired by each of the optical sensors disposed in the moving body is transmitted to the movement amount acquisition unit by using communication means such as a wired one or a wireless one, and a movement amount of the moving body acquired by the movement amount acquisition unit based on the image data is transmitted to the arithmetic processing unit by using communication means such as a wired one or a wireless one.

The moving body may be configured so that: the two wheels are not connected to each other by an axle and these wheels are driven independently of each other; and vertical movements of each of these wheels are absorbed by a damper provided in that wheel so that the vertical movements of that wheel does not affect the other wheel. In the case where the moving body is configured as described above, even when the plurality of optical sensors are arranged so that a line connecting arbitrary two of them are parallel to a line connecting the centers of arbitrary two of the plurality of wheels, the problem described above with reference to FIG. 5 is less likely to occur. That is, the problem that when the moving body gets over an obstacle such as a step with a plurality of wheels, two optical sensors are simultaneously excluded in the calculation of the movement amount at the reference point of the moving body is less likely to occur. Further, needless to say, when the moving body includes only one wheel as described above, the problem described above with reference to FIG. 5 does not occur.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A movement amount detection system comprising:
   a plurality of optical sensors disposed in a moving body, each of the plurality of optical sensors being configured to acquire image data of a floor surface, the number of the plurality of optical sensors being at least three;
   a movement amount acquisition unit configured to acquire, by using the image data acquired by the optical sensors, a movement amount of the moving body at each of a plurality of places where a respective one of the plurality of optical sensors is disposed; and
   an arithmetic processing unit configured to calculate the movement amount of the moving body at a reference point located thereon by using the movement amount of the moving body at each of the plurality of places where a respective one of the plurality of optical sensors is disposed, acquired by the movement amount acquisition unit, wherein
   the arithmetic processing unit calculates a second movement amount at the reference point by using first movement amounts, each of which is detected based on image data acquired by a respective one of the plurality of optical sensors, and inversely calculates a third movement amount at each of the plurality of places where a respective one of the plurality of optical sensors is disposed from the second movement amount, and
   the arithmetic processing unit determines, among the plurality of optical sensors, an optical sensor that should be excluded in the calculation of the movement amount at the reference point of the moving body based on a difference between the first movement amounts and the third movement amount at each of the plurality of optical sensors.

2. The movement amount detection system according to claim 1, wherein when the moving body comprises a plurality of wheels, the plurality of optical sensors are arranged so that a line connecting any two of them is not parallel to a line connecting the centers of any two of the plurality of wheels in the moving body.

3. The movement amount detection system according to claim 1, wherein the arithmetic processing unit takes information obtained by various types of sensors provided in the moving body into consideration when it determines the optical sensor that should be excluded in the calculation of the movement amount at the reference point of the moving body.

4. The movement amount detection system according to claim 1, further comprising a plurality of height detection sensors, each of the plurality of height detection sensors being disposed near a respective one of the plurality of optical sensors and configured to detect a height of the respective one of the plurality of optical sensors from the floor surface, wherein
   values detected by the height detection sensors are taken into consideration when the optical sensor that should be excluded in the calculation of the movement amount at the reference point of the moving body is determined.

5. The movement amount detection system according to claim 4, wherein each of the height detection sensors is one that uses a pattern projection principle.

6. The movement amount detection system according to claim 2, wherein the plurality of optical sensors are arranged so that they are not located on the same circumference centered at the reference point in the moving body.

7. A method for detecting a movement amount comprising:
   a first step of acquiring, by using image data of a floor surface acquired by a plurality of optical sensors disposed in a moving body, a movement amount of the moving body at each of a plurality of places where a respective one of the plurality of optical sensors is disposed, each of the plurality of optical sensors being configured to acquire the image data of the floor surface, the number of the plurality of optical sensors being at least three; and a second step of calculating the movement amount of the moving body at a reference point located thereon by using the movement amount of the moving body at each of the plurality of places where a respective one of the plurality of optical sensors is disposed, acquired in the first step, wherein in the first step, a second movement amount at the reference point is calculated by using first movement amounts, each of which is detected based on image data acquired by a respective one of the plurality of optical sensors, and a third movement amount is inversely calculated at each of the plurality of places where a respective one of the plurality of optical sensors is disposed from the second movement amount, and among the plurality of optical sensors, an optical sensor that should be excluded in the calculation of the movement amount at the reference point of the moving body is determined based on a difference between the first movement amounts and the third movement amount at each of the plurality of optical sensors.

8. A non-transitory computer readable medium storing a program for causing a computer to perform:

a first step of acquiring, by using image data of a floor surface acquired by a plurality of optical sensors disposed in a moving body, a movement amount of the moving body at each of a plurality of places where a respective one of the plurality of optical sensors is disposed, each of the plurality of optical sensors being configured to acquire the image data of the floor surface, the number of the plurality of optical sensors being at least three; and a second step of calculating the movement amount of the moving body at a reference point located thereon by using the movement amount of the moving body at each of the plurality of places where a respective one of the plurality of optical sensors is disposed, acquired in the first step, wherein in the first step, a second movement amount at the reference point is calculated by using first movement amounts, each of which is detected based on image data acquired by a respective one of the plurality of optical sensors, and a third movement amount is inversely calculated at each of the plurality of places where a respective one of the plurality of optical sensors is disposed from the second movement amount, and among the plurality of optical sensors, an optical sensor that should be excluded the calculation of the movement amount at the reference point of the moving body is determined based on a difference between the first movement amounts and the third movement amount at each of the plurality of optical sensors.

* * * * *